Aug. 14, 1928.
O. PETERMANN
1,681,008
DOORKNOB CONSTRUCTION
Filed March 14, 1927
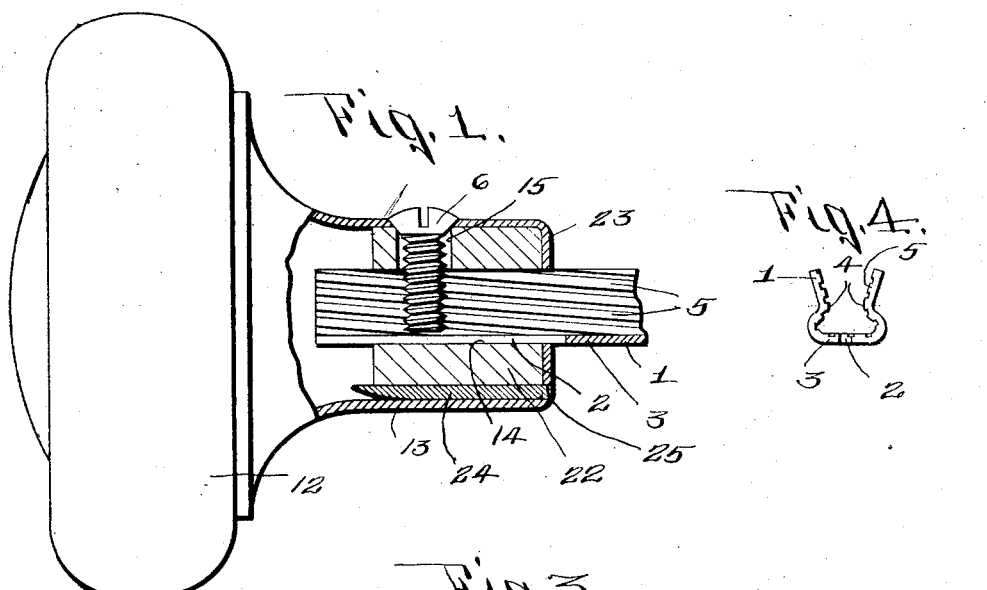
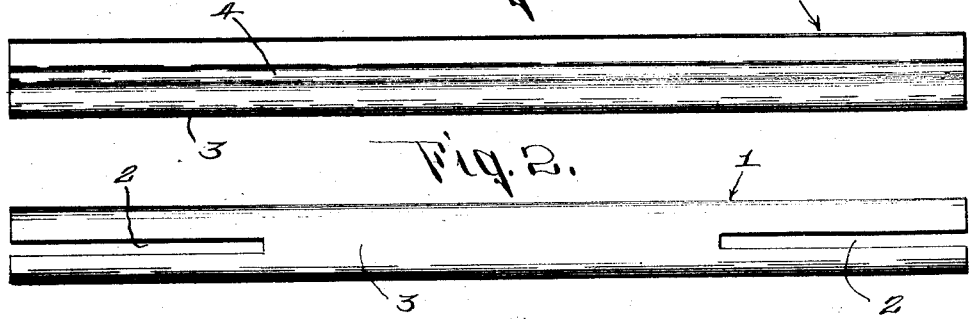
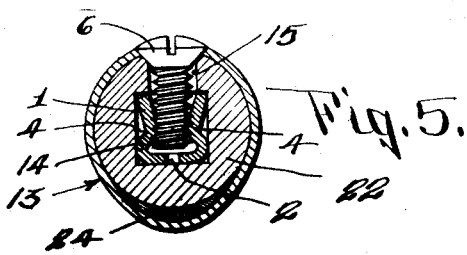
INVENTOR.
Otto Petermann
BY Parsons & Bodell
ATTORNEYS.

Patented Aug. 14, 1928.

1,681,008

UNITED STATES PATENT OFFICE.

OTTO PETERMANN, OF GROTON, NEW YORK, ASSIGNOR TO THE AMERICAN HARDWARE CORPORATION, OF NEW BRITAIN, CONNECTICUT, A CORPORATION OF CONNECTICUT.

DOOR-KNOB CONSTRUCTION.

Application filed March 14, 1927. Serial No. 175,059.

This invention relates to door knob constructions and has for its object a particularly simple and efficient means or construction for securing the knob to the shank whereby the knob cannot be inadvertently displaced.

The invention consists in the novel features and in the combinations and constructions hereinafter set forth and claimed.

In describing this invention reference is had to the accompanying drawings in which like characters designate corresponding parts in all the views.

Figure 1 is an enlarged side elevation of this door knob construction particularly broken away.

Figure 2 is an enlarged detail plan view of one form of the shank of the door knob.

Figures 3 and 4 are respectively a side elevation and end view thereof.

Figure 5 is a sectional view through the hub of the knob taken on the axis of the screw, Figure 1.

This door knob construction comprises generally a shank which is expansible at one end or each end, a knob mounted on the expansible end of the shank and means for expanding the shank within the knob to hold the knob on the shank. The knob is formed with the usual hub sleeved on the shank and preferably the expanding means extends transversely through the hub in the same location heretofore occupied by the set screw used to hold knobs on their shanks.

1 designates the shank which is usually square in general form in cross section and preferably the shank is formed expansible at the ends thereof by slotting or splitting it lengthwise as at 2. Preferably the shank is formed up of sheet metal as shown in Figures 2, 3 and 4 in the form of a U-shaped channel and the bottom 3 of the channel at each end is slotted in order that the ends may be expansible. The width of the slots may be the full width of the portions but preferably is merely a narrow cut along the center of the bottom in order to not unduly weaken the end portions of the shank. Also the side flanges of the channel are formed with lengthwise beads or indentations 4 into which the fastening screws bite. The internal faces of the side flanges may if desired be roughened by lengthwise ridges 5 which are preferably so inclined that the threads of the set screw 6 interlock therewith. The ridges may, however, be omitted.

The knob 12 has the usual hub 13 and the hub has a passage 14 therein for receiving the shank. The passage 14 and shank are preferably square. The hub also has a hole 15 arranged to come into alignment with the channel of the shank, Figures 2, 3, 4. The hole 15 may or may not be threaded.

The means for expanding the shank comprises a wedge member extending through the hole 15, this wedge member being of greater diameter than the distance between the walls of the channel in the shank, so that it spreads the shank and hence expands the shank or split end thereof into snug engagement with the walls of the square passages 14 in the hub 13. This wedge is usually the screw 6 and the threads thereof bite into the walls of the channel or the ridges 4. In the form shown in Figures 2 and 3 the channel walls are flared outwardly due to the formation of the head and these flared walls guide the screw into the narrower part of the channel, and hence an ordinary blunt end screw may be used. Either blunt or pointed end screw may be used.

The knob 12 usually includes a hollow outer shell having a hub portion and a plug 22 in the hub portion, the plug being formed with a passage 14 which may be round or square. This plug is usually metal and the end wall of the hub portion of the shell laps as at 23 the outer end of the plug. These plugs are sometimes somewhat loose and therefore, in order to tighten the same, means is provided for holding them snugly in the hub portion of the knob and this means is here shown as a wedge 24 inserted between the walls of the hub portion and the plug. Preferably, the wall 23 lapping the end of the plug is formed with a hole 25 for receiving a wedge 24.

In operation, one knob of course can be fixed to the shank before the shank is inserted in the hole of the lock construction not shown. Thereafter, the other knob is placed on the shank and slid along the same until its hub is in proper position to prevent undue endwise movement of the shank. The screw 6 is then inserted and as it is screwed or forced inwardly by turning spreads the split end of the shank into snug engagement with the walls of the passage 14 and if this passage is round, it causes the edges of the flanges of the channel to bite into the walls of the passage 14, and the shank is spread into engagement with the wall of the passage 14 and hence held therein with a vise-like grip. Also the screw distorts or spreads outwardly the portions of the beads with which the screw engages. This is possible because the beads are recessed beads formed by corrugations having surfaces opposed to and spaced away from the walls of the socket in the hub. By this construction, the screw is locked in the hole 15 and cannot become unintentionally displaced and further the knob can be accurately located and no washers or other space filling means are necessary.

What I claim is:—

1. A door knob construction comprising a U-shaped shank constituting an elongated channel member, a knob having a hub surrounding one end of said shank, said hub having a hole in alinement with the channel of said shank, and a member of greater diameter than the distance between said walls passing through said hole into said channel and separating the walls of said channel into binding engagement with said hub.

2. A door knob construction comprising a U-shaped sheet metal shank constituting an elongated channel member having a side wall inwardly bent so as to form a recessed bead, a knob having a hub surrounding one end of said shank said hub having a hole in alinement with the channel of said shank, and a member of greater diameter than the distance between said walls passing through said hole into said channel and separating the walls of said channel into binding engagement with said hub.

3. A door knob construction comprising a U-shaped sheet metal shank constituting an elongated channel member having both of its side walls inwardly bent so as to form recessed beads, a knob having a hub surrounding one end of said shank, said hub having a hole in alinement with the channel of said shank, and a member of greater diameter than the distance between said walls passing through said hole into said channel and separating the walls of said channel into binding engagement with said hub.

4. A door knob construction comprising a U-shaped sheet metal shank constituting an elongated channel member having a side wall inwardly bent so as to form a recessed bead, a knob having a hub surrounding one end of said shank said hub having a hole in alinement with the channel of said shank, and a screw of greater diameter than the distance between said walls passing through said hole into said channel and separating the walls of said channel into binding engagement with said hub, the screw threads of said screw engaging the bead on the inwardly bent side wall.

5. A door knob construction comprising a U-shaped sheet metal shank constituting an elongated channel member having both of its side walls inwardly bent so as to form recessed beads, a knob having a hub surrounding one end of said shank, said hub having a hole in alinement with the channel of said shank, and a screw of greater diameter than the distance between said walls passing through said hole into said channel and separating the walls of said channel into binding engagement with said hub, the screw-threads of said screw engaging the beads on both of the inwardly bent side walls.

6. A door knob construction comprising a U-shaped shank constituting an elongated channel member, a knob having a hub surrounding one end of said shank, said hub having a hole in alinement with the channel of said shank, and a member of greater diameter than the distance between said walls passing through said hole into said channel and separating the walls of said channel into binding engagement with said hub, the end of said shank within said hub being split.

7. A door knob construction comprising a U-shaped sheet metal shank constituting an elongated channel member having a side wall inwardly bent so as to form a recessed bead, a knob having a hub surrounding one end of said shank said hub having a hole in alinement with the channel of said shank, and a screw of greater diameter than the distance between said walls passing through said hole into said channel and separating the walls of said channel into binding engagement with said hub, the end of said shank within said hub being split.

8. A door knob construction comprising a U-shaped sheet metal shank constituting an elongated channel member having both of its side walls inwardly bent so as to form recessed beads, a knob having a hub surrounding one end of said shank, said hub having a hole in alinement with the channel of said shank, and a screw of greater diameter than the normal distance between said walls passing through said hole into said channel and separating the walls of said channel into binding engagement with said hub, the screw-threads of said screw engaging the beads on the inwardly bent side walls, the end of said shank within said hub being split.

9. A door knob construction comprising a U-shaped sheet metal shank constituting an elongated channel member having both of its side walls inwardly bent so as to form recessed beads, a knob having a hub surrounding one end of said shank, said hub having a hole in alinement with the channel of said shank, and a screw of greater diameter than the normal distance between said walls passing through said hole into said channel and separating the walls of said channel into binding engagement with said hub, the screw-threads of said screw engaging the beads on the inwardly bent side walls, the end of said shank within said hub being split, and the inner surfaces of said side walls being roughened.

10. A door knob construction comprising an integral sheet metal shank having two spaced walls and a peripheral connection joining together one edge of each of said walls, one of said walls being corrugated so as to form a recessed inwardly projecting bead, a knob having a hub surrounding one end of said shank, said hub having a hole in alinement with the space between said walls, and a screw of greater diameter than the distance between said walls passing through said hole into said space and separating the walls into binding engagement with said hub.

11. A door knob construction comprising an integral sheet metal shank having two spaced walls and a peripheral connection joining together one edge of each of said walls, one of said walls being corrugated so as to form a recessed inwardly projecting bead, a knob having a hub surrounding one end of said shank, said hub having a hole in alinement with the space between said walls, and a screw of greater diameter than the distance between said walls passing through said hole into said space and separating the walls into binding engagement with said hub, said peripheral connection being confined to the central portion of said shank.

In testimony whereof, I have hereunto signed my name, at Syracuse, in the county of Onondaga, and State of New York, this 23rd day of February, 1927.

OTTO PETERMANN.